Dec. 17, 1968 P. D. MACA 3,416,384
BELT MACHINE
Filed May 5, 1967 2 Sheets-Sheet 1

INVENTOR.
Paul Donald Maca,
BY Parker & Carter
Attorneys.

Dec. 17, 1968  P. D. MACA  3,416,384
BELT MACHINE

Filed May 5, 1967  2 Sheets-Sheet 2

INVENTOR.
Paul Donald Maca,
BY Parker & Carter
Attorneys.

United States Patent Office 3,416,384
Patented Dec. 17, 1968

3,416,384
BELT MACHINE
Paul Donald Maca, Western Springs, Ill., assignor to Sommer & Maca Glass Machinery Company, Chicago, Ill., a corporation of Illinois
Filed May 5, 1967, Ser. No. 636,407
1 Claim. (Cl. 74—242.16)

ABSTRACT OF THE DISCLOSURE

A belt machine having a tensionnig roller within a housing and fixedly secured to a shaft which is journaled eccentrically within a rotatable cylinder positioned externally of the housing, the bearing being remote from fluid carried by the belt, the cylinder being rotatable downwardly to position the roller for increased belt tension and having a means for locking the cylinder in the desired tension position of the roller.

This invention relates to belt machines and particularly to a continuous belt machine having an adjustable tension roller.

One purpose of the invention is to provide a belt machine having a tensioning roller within a housing and a bearing support for said roller externally of said housing.

Another purpose is to provide a belt machine having a tensioning roller and a remote bearing support for said roller.

Another purpose is to provide a tension roller having an eccentrically mounted bearing support positioned at a point remote from said roller.

Another purpose is to provide a tensioning roller, an eccentrically mounted bearing for said roller, and means for moving and locking said bearing at a desired position.

Other purposes may appear from time to time during the course of the specification and claims.

Figure 1:
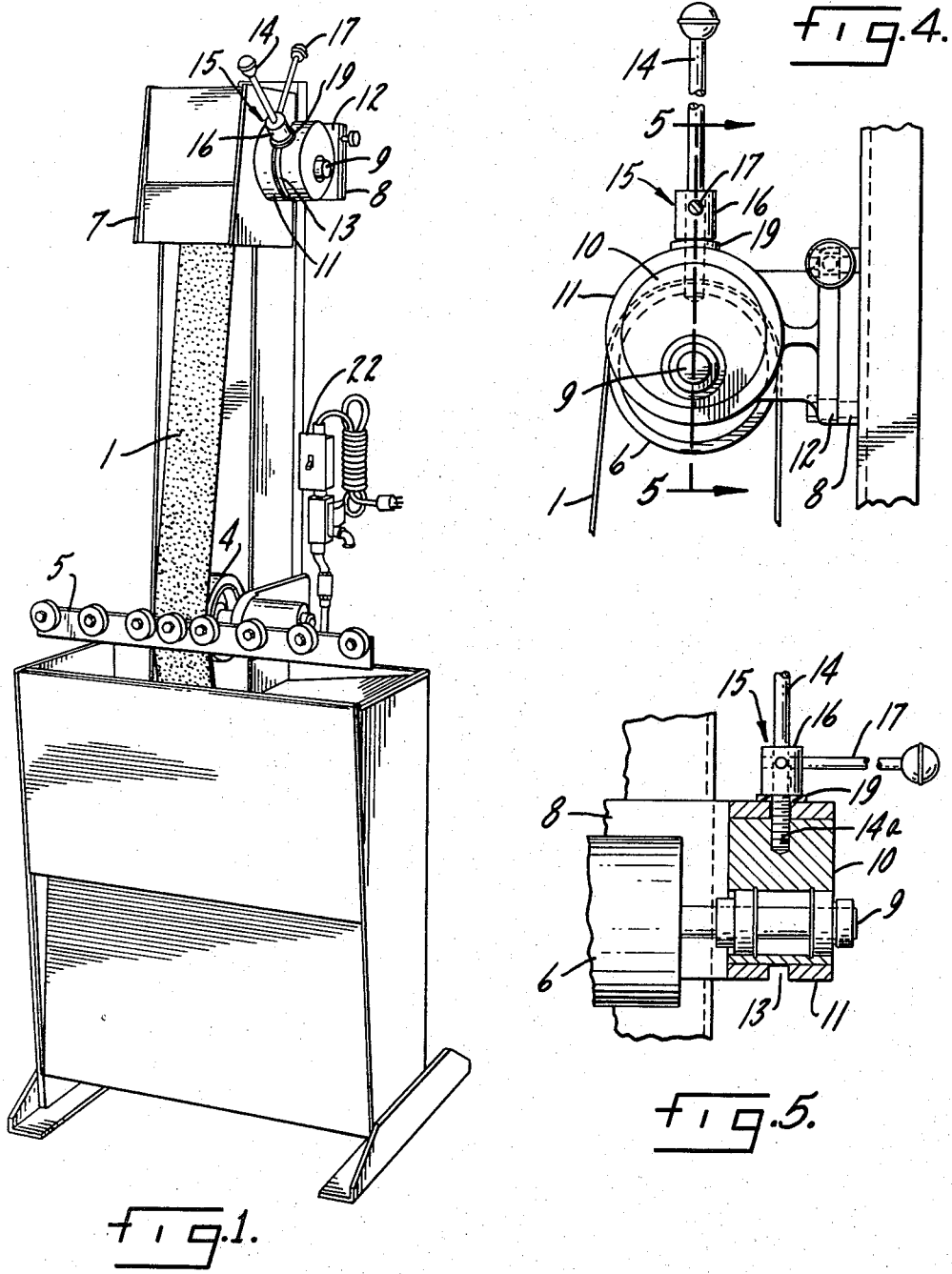
Figure 2:
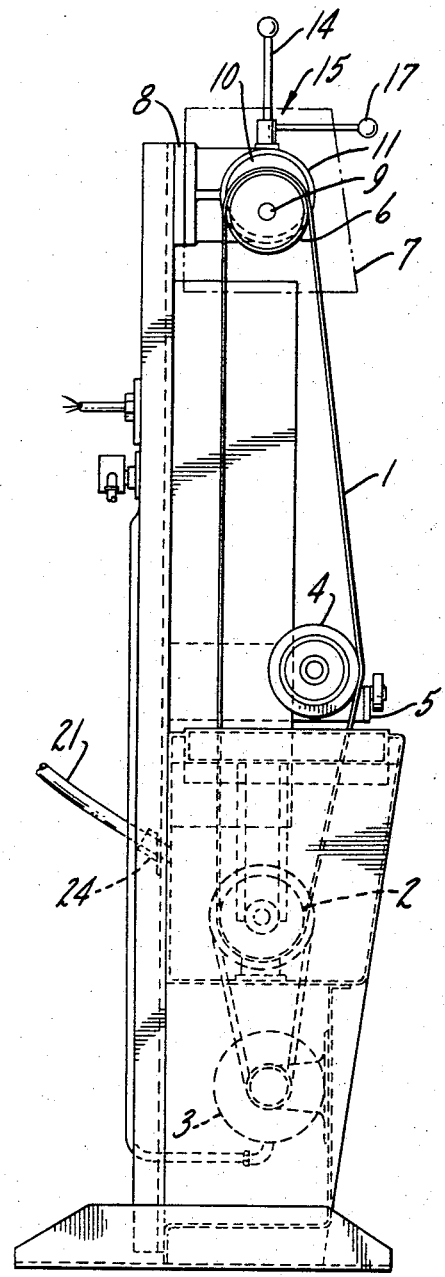
Figure 3:
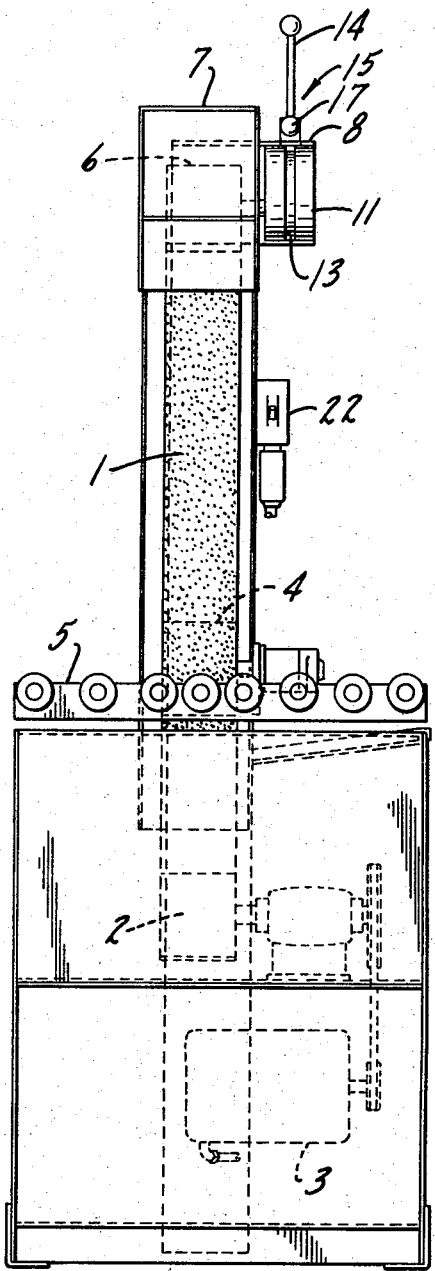

The invention is illustrated more or less diagrammatically in the accompanying drawings, wherein:

FIGURE 1 is a front perspective;
FIGURE 2 is a side view;
FIGURE 3 is a front view;
FIGURE 4 is a detail view of the belt tensioning means of FIGURE 1; and
FIGURE 5 is a section taken on the line 5—5 of FIGURE 4.

Like parts are indicated by like numerals throughout the specification and drawings.

Referring now to the drawings, and particularly to FIGURE 1 thereof, the numeral 1 generally indicates a continuous belt. The belt 1 is driven by and about a roller 2 positioned at one end thereof, the roller 2 being in turn driven by motor means 3. A frictional idler roller 4 engages the under or inner surface of the belt 1 intermediate its ends and adjacent a roller track 5 along which a piece to be polished, ground or otherwise treated by the belt 1 may be supported and moved. The opposite end of the belt 1 is turned about a tensioning roller 6, the said end of belt 1 and roller 6 being positioned within a housing or hood 7 carried by support 8.

The roller 6 is fixedly secured to a shaft 9 extending through one wall of the housing 7 and eccentrically through a massive cylinder member 10. The member 10 is journaled in a corresponding sleeve 11, which is in turn supported by a bracket 12 secured to support 8.

A slot 13 is formed in the circumferential wall of the sleeve 11 and a handle member 14 extends through the slot 13. The handle member 14 threadably engages the threads of a threaded well 14a formed in the cylinder member 10 in alignment with the slot 13.

A lock member 15 includes a collar 16 rotatably threaded on handle 14 and a lock handle 17 secured to and radially extending from the collar 16. The collar 16 carries a frictional ring member 19 for contact with the external surface of sleeve 11 along the borders of slot 13.

A splash-confining shroud of flexible material hangs from the hood or housing 7 on either side of and behind the belt 1. A suitable conduit, such as that indicated at 21, supplies fluid and suitable electrical controls including, for example, the switch 22 are provided for actuation of motor 3. A spray nozzle 24 is provided for a spray of fluid, such as water, to the belt 1 as it approaches the drive roller 2.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

The use and operation of the invention are as follows:

The operator begins the movement of the belt 1 by actuation of the switch 22 to energize motor 3 and to supply liquid at nozzle 24. The desired tension of belt 1 is accomplished by movement of handle 14 to rotate member 10 within sleeve 11. Movement of lock handle 17 in a counterclockwise direction moves collar 16 and friction element 19 away from sleeve 11, thus freeing handle 14 for movement downwardly or upwardly within the slot 13 to rotate the member 10 within sleeve 11. Thus downward movement of handle 14 results in upward movement of the shaft 9 and roller 6 to increase tensioning of the belt 1. When the desired tension of belt 1 is reached, the operator merely moves lock handle 17 in a clockwise direction to rotate collar 16 on the threads of handle 14 and to bring and hold the friction element 19 into engagement with the external surface of sleeve 11. The tension of belt 1 can be adjusted as desired at any time by a repetition of the steps described.

The bearing for tensioning roller 6 is positioned entirely externally of housing 7 and is thus free of the undesirable effects of contact with the fluid supplied at nozzle 24 and carried throughout the assembly of the invention by the belt 1. The cylindrical member 10 is of massive configuration, providing a bearing of sufficient length for the shaft 9 and roller 6 to preclude misalignment or binding. Similarly, the slot 13 is positioned intermediate the opposite ends of sleeve 11 to provide for ease of rotation without binding of the member 10 within the sleeve 11. Handle 14 engages member 10 at a point substantially diametrically across from shaft 9. Hence movement of handle 14 in one direction results in reverse movement of shaft 9 and roller 6.

Thus the operator, to increase tension, moves handle 14 downward, a movement conforming to that employed in a variety of production tools, such as drill presses and the like. The bearing for roller 6 is free of the deleterious effects of water contact. The movement of roller 6 is accomplished in a simplified, yet assured, manner and the roller 6 is securely held in desired position.

There is claimed:

1. A belt matchine including a continuous belt, a tensioning roller positioned to engage the inner surface of said belt and fixedly secured to an elongated shaft, a rotatable cylindrical member, said shaft being eccentrically journaled in said member, a wall between said member and said roller, said shaft extending through said wall, a sleeve rotatably receiving said member beyond said wall from said roller, a circumferentially disposed slot formed intermediate the ends of said sleeve and a handle extending through said slot in radial ralationship to said sleeve and member and engaging said member, and lock means for said member including a collar rotatably threaded on said handle and having a frictional surface engageable with the external surface of said sleeve along the borders of said slot.

References Cited

UNITED STATES PATENTS

| | | | |
|---|---|---|---|
| 239,163 | 3/1881 | Hicks | 74—242.16 |
| 1,206,538 | 11/1916 | Howe | 74—242.16 |
| 1,535,568 | 4/1925 | Bornschein | 74—242.16 XR |
| 1,549,845 | 8/1925 | Munz | 74—242.16 XR |
| 1,612,282 | 12/1926 | Goodwin et al. | 74—242.16 XR |
| 1,612,685 | 12/1926 | Wittmann | 74—242.16 XR |
| 2,436,504 | 2/1948 | Duncklee | 74—242.16 XR |

FRED C. MATTERN, JR., *Primary Examiner.*

J. A. WONG, *Assistant Examiner.*